April 24, 1956 L. THOMPSON ET AL 2,743,319

SCANNING MECHANISM FOR MAGNETIC TAPE RECORDERS

Filed Dec. 24, 1952 5 Sheets-Sheet 1

INVENTORS
FRANK E. RUNGE
LINCOLN THOMPSON
WILLIAM H. LYON

BY H. G. Manning
ATTORNEY

SCANNING MECHANISM FOR MAGNETIC TAPE RECORDERS

Filed Dec. 24, 1952 5 Sheets-Sheet 2

INVENTORS
FRANK E. RUNGE
LINCOLN THOMPSON
WILLIAM H. LYON

BY H. G. Manning
ATTORNEY

SCANNING MECHANISM FOR MAGNETIC TAPE RECORDERS

Filed Dec. 24, 1952 5 Sheets-Sheet 3

INVENTORS
FRANK E. RUNGE
LINCOLN THOMPSON
WILLIAM H. LYON
BY H. G. Manning
ATTORNEY

SCANNING MECHANISM FOR MAGNETIC TAPE RECORDERS

Filed Dec. 24, 1952 5 Sheets-Sheet 4

INVENTORS
FRANK E. RUNGE
LINCOLN THOMPSON
WILLIAM H. LYON
BY H. G. Manning
ATTORNEY INVENTORS
FRANK E. RUNGE
LINCOLN THOMPSON
WILLIAM H. LYON
BY H. G. Manning
ATTORNEY

United States Patent Office 2,743,319

Patented Apr. 24, 1956

2,743,319

SCANNING MECHANISM FOR MAGNETIC TAPE RECORDERS

Lincoln Thompson, Cheshire, Frank E. Runge, Branford, and William H. Lyon, Orange, Conn., assignors to The Soundscriber Corporation, New Haven, Conn., a corporation of Connecticut Application December 24, 1952, Serial No. 327,834

13 Claims. (Cl. 179—100.2)

This invention relates to sound recording and reproducing devices, and more particularly to a long playing interrupted track magnetic recording and playback apparatus in which the sound is recorded transversely on a wide flexible strip of tape coated on one side with an emulsion of magnetic particles.

One object of this invention is to provide a practical recording and reproducing apparatus of the above nature wherein a series of successive arcuate sound tracks may be impressed laterally across a slowly moving recording tape by means of a plurality of electro-magnetic transducer heads radially disposed on a rotating turntable member located in the path of said tape.

A further object is to provide a novel apparatus of the above nature having means to permit the tape to be easily and quickly threaded into the apparatus for recording and playback, as well as for rapidly and audibly scanning the tape to determine specific locations of material recorded thereon.

A further object is to provide an apparatus of the above nature which will be simple in construction, inexpensive to manufacture, easy to install and manipulate, compact, ornamental in appearance, and very efficient and durable in use.

With these and other objects in view there has been illustrated on the accompanying drawings, one form in which the invention may conveniently be embodied in practice.

The present invention relates to an improvement over the invention disclosed in the co-pending application of Lincoln Thompson, Frank E. Runge, and William H. Lyon, Serial Number 255,184, entitled "Long Playing Magnetic Tape Recorder," filed November 7, 1951, and an application of William H. Lyon, Serial Number 284,716, filed April 28, 1952, entitled Automatic Syncronization Apparatus for Long Time Transverse Magnetic Sound recorder and Reproducer.

The present invention relates to a scanning mechanism for magnetic recorders in which two levers are provided to place the apparatus into condition for loading, recording, and playback, and scanning, respectively.

In the operation of this apparatus, several steps may be performed simultaneously in loading the tape.

1. The gate must be lifted to relieve pressure from the tape.
2. The pressure roller must be released from the drive roller.
3. The tension shoe which presses the tape against the first guide roller must be released.
4. The tapered roller which holds the tape against the main guide roller must be relieved.
5. The belt tension on the takeup reel must also be relieved by releasing the idler pulley.

These steps are accomplished by means of a lever and linkage system which is actuated by the scanning and loading levers located at the front of the machine.

Figure 1:
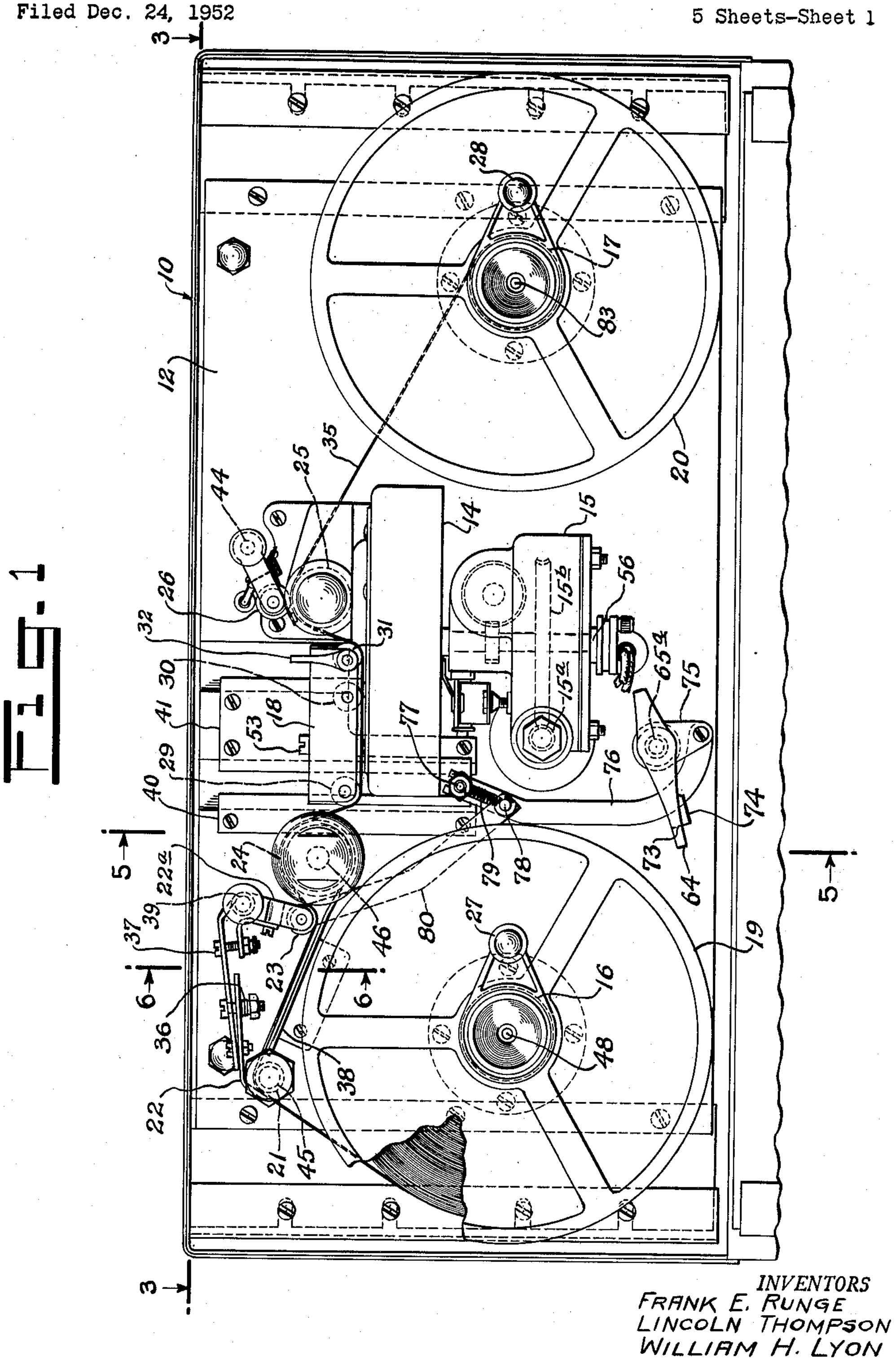
Fig. 1 represents a front view in elevation of a magnetic tape recorder embodying the invention, with the pressure gate and pressure roller lowered to their recording positions.

In recording lengthy communications, long silent places frequently occur, and it is therefore desirable to have an apparatus which will scan the record rapidly and pass over such silent places quickly. In the present invention, this is accomplished by providing mechanism which will move the tape forward or backward at rapid speed over the constantly rotating magnetic head. By means of this arrangement, fragments of the recorded intelligence may be reproduced sufficiently to scan the material rapidly much in the same manner that a ball-pointed stylus needle may be slid across the grooves of a rotating phonograph disk during playback.

Mechanism is also provided to additionally permit the tape to be rewound easily from one reel to another. In the latter condition, however, there can be no playback because the pressure gate and pressure roller will be raised and the tape will not be pressed upon the magnetic heads at that time.

An important feature of the present invention is the use of a pair of control levers, located one behind the other. The first of these levers is for "scanning" and performs the function of lifting the pressure roller free from the drive-roller in order to permit the tape to be moved freely and rapidly over the transducer head manually, and without stopping the rotation of the turntable. Additionally it relieves the tension on the takeup belt, thus permitting both reels to move freely. In scanning, of course, the gate will be down, and the pressure roller will be raised.

If, however, it is desired to play back the recorded tape at normal speed when a particular point thereon has been located, it will merely be necessary to flip the "scan" lever back to its original position, permitting playback to proceed in regular fashion.

Another important feature of the present invention is the linkage mechanism to lift the pressure gate to permit the tape to be moved freely for loading and rewinding. This is accomplished by means of the second control or "load" lever.

Referring now to the drawings, in which like reference numerals denote corresponding parts throughout the several views, the numeral 10 indicates a cabinet for housing the operating mechanism, said cabinet having a rear panel 11, a mechanical chassis 12, and a motor 13. The motor 13 serves to drive the magnetic head transducer turntable 14 by means of a speed-reducing gear box 15.

In order to cause the magnetic tape 35 to be passed automatically through the recording apparatus, provision is made of a pair of spindles 16 and 17 on which are mounted a feed reel 19 and a take-up reel 20, respectively.

Between the two reels 19 and 20, provision is made of a pressure gate assembly 18, and means to guide the tape 35 from the feed reel 19 to said pressure gate, comprising a first tape guide roller 21, a tape tension shoe 22, and a tapered roller 23 carried on the opposite ends of a bell crank lever 22*a* mounted on a pivot 39. The tape then passes over a tape guide drum 24, and over a drive roller 25 at the other side of the pressure gate 18. At this point, the tape 35 passes under a pressure roller 26, and thence to the take-up reel 20.

In order to manually wind the tape on the feed reel 19 and the take-up reel 20, provision is made of a pair of hand cranks 27, 28 located on the front of said reels. The pressure gate 18 is provided with a pair of bottom rollers 29 and 30, and an eccentric roller 31, the latter roller being controlled manually by an upstanding handle 32.

Figures 5, 6:
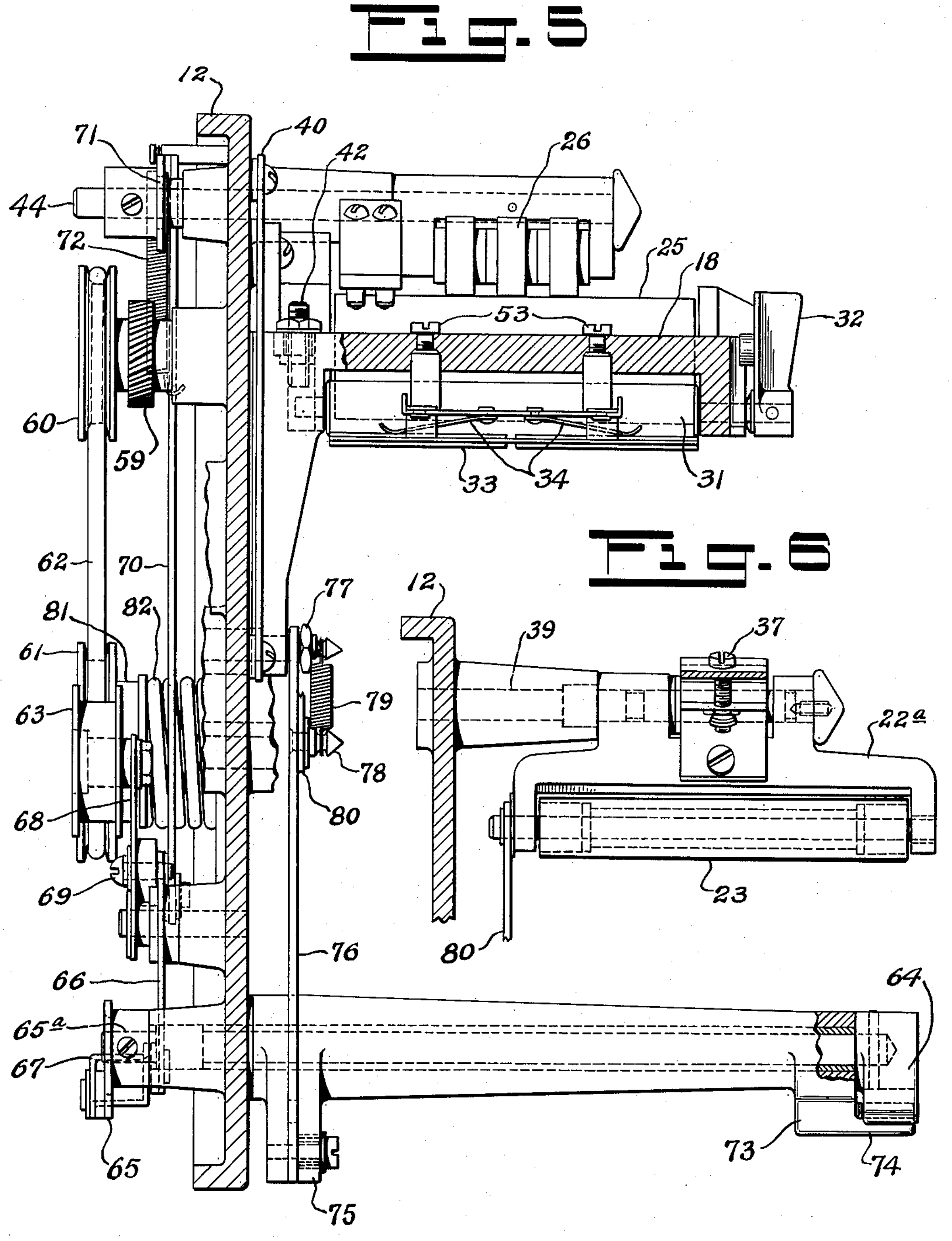
Fig. 5 is a side view, partly in section, on an enlarged scale, taken along the line 5—5 of Fig. 1, looking from the left.
Fig. 6 is a fragmentary cross-section view on an enlarged scale, taken along the line 6—6 of Fig. 1, and showing the mounting of the tapered roller.

As clearly shown in Fig. 5, an articulated flexible pressure plate 33 is secured to the lower side of the pressure gate 18 by screws 53, below which the magnetic tape 35 is adapted to pass. A pair of leaf springs 34 serve to press downwardly upon said plate 33.

Provision is also made of a tape tension shoe coil spring 36 (Fig. 1), having an adjusting screw 37 to control the drag of the tape 35 in passing from the feed reel 19 to the pressure gate 18. A tape threading barrier 38 is located underneath the path of the tape 35.

Figure 2:
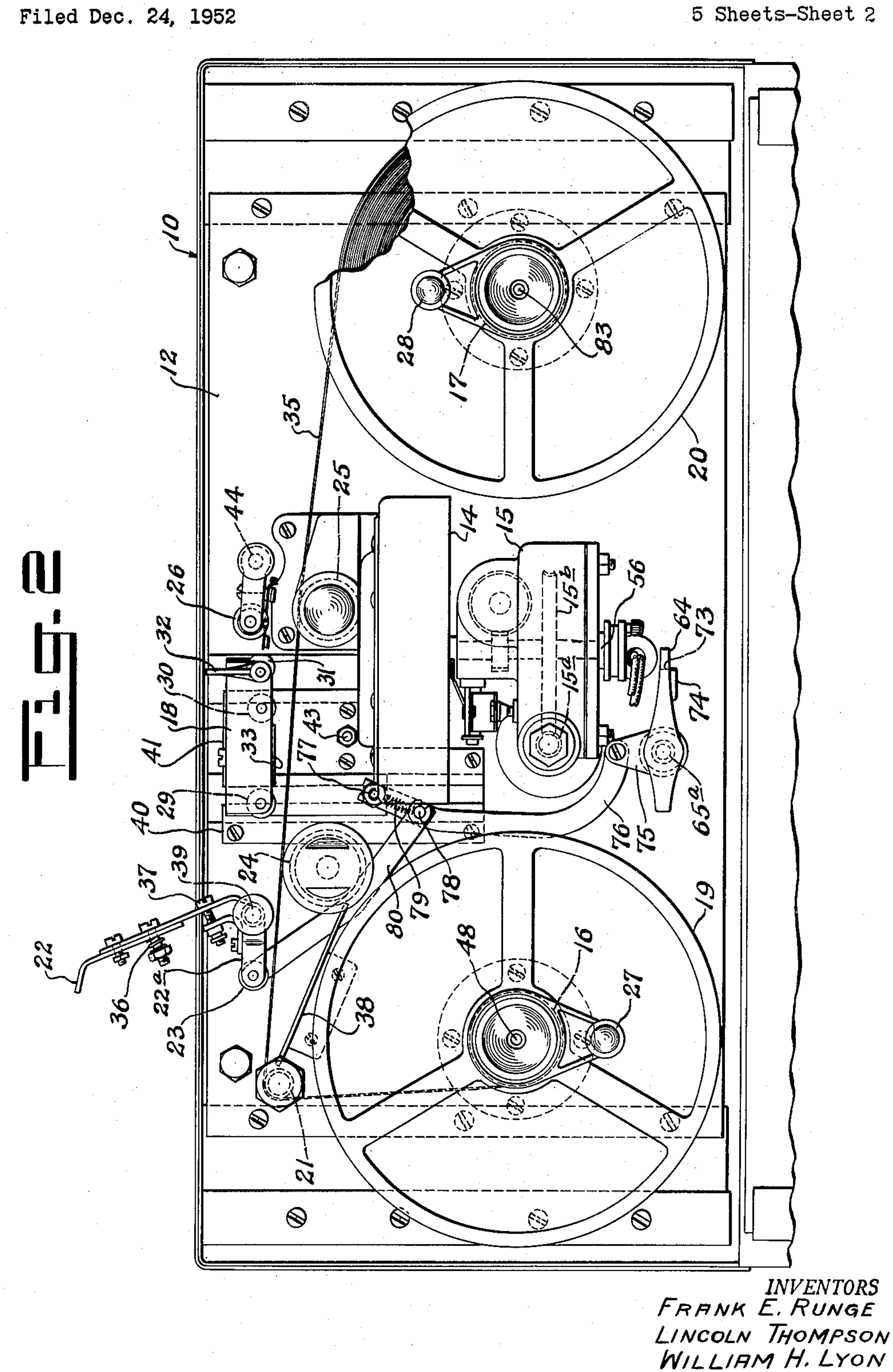
Fig. 2 is a similar view of the same with the gate and the pressure roller raised to their tape loading positions.
Figure 3:
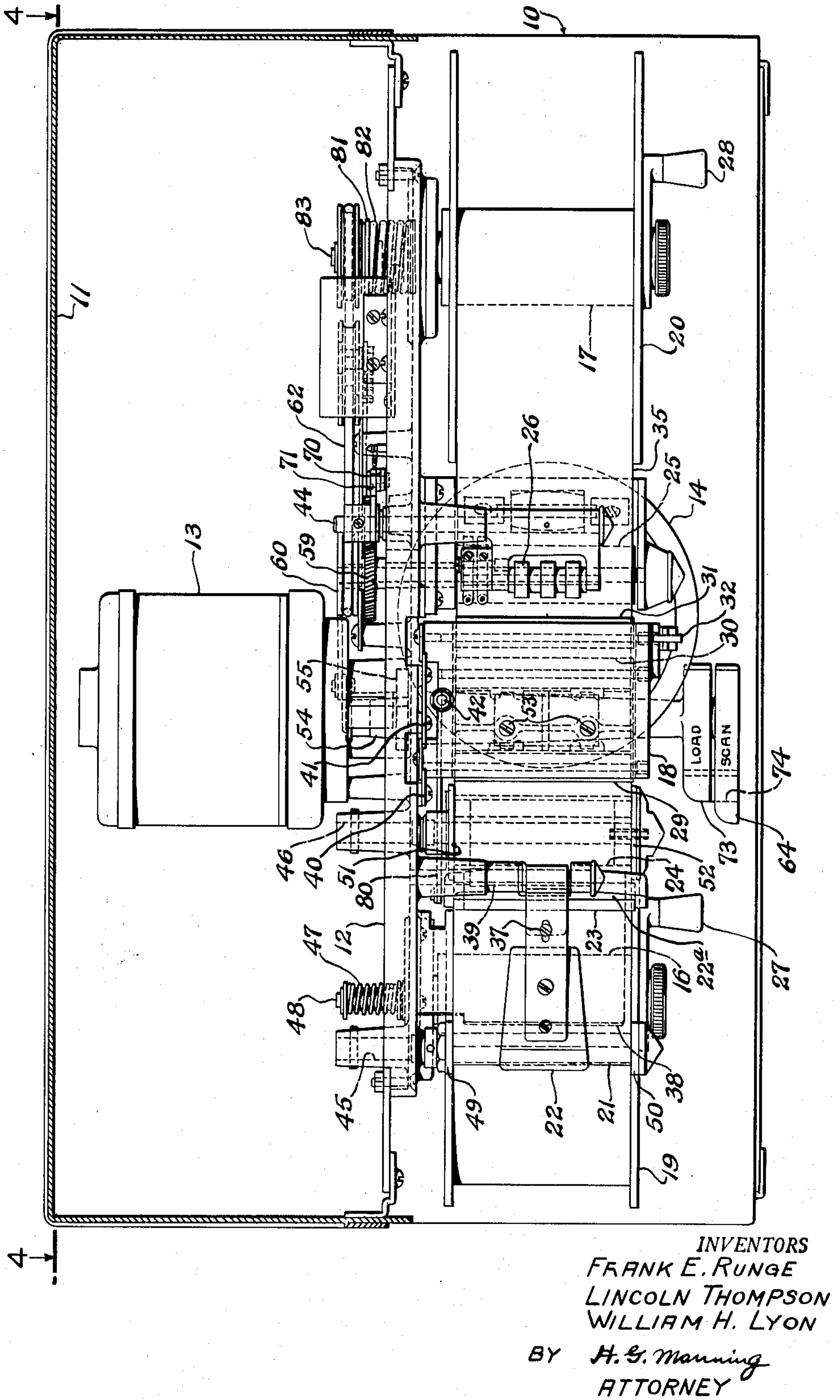
Fig. 3 is a top plan view of the apparatus with the parts in the same position as in Fig. 1, the view being taken along the line 3—3 of Fig. 1, looking in the direction of the arrows.

The pressure gate 18 is adapted to be moved up and down within a pair of vertical guide-ways 40, 41, the downward gate travel being limited by means of a screw 42 and a stop stud 43 (Figs. 2 and 3).

The feed reel spindle 16 is mounted upon a shaft 48 having a friction braking coil spring 47 connected therewith (Fig. 3), and the first guide roller 21 has a tape guiding flange 49 behind the tape and a similar guide flange 50 in front of said tape. Additional tape guiding flanges 51 and 52 are provided on the second guide drum 24.

The shaft of the motor 13 is provided with an adapter 54 (Fig. 3) by means of which it is connected with a flexible coupling 55, which in turn is connected to a high speed worm 15*a* (Fig. 2) which drives a turntable gear cluster 15*b* located in the gear box 15.

The turntable 14 is mounted upon a removable vertical spindle 56, as clearly shown in Fig. 1.

The tape 35 is adapted to be passed through the apparatus by a train of gears 57, 58, 59 (Fig. 4), the gear 57 being driven from the gear cluster 15*b* through the gear 58, and the gear 59, which drives the pulley 60.

The pulley 60 is connected by means of a belt 62 to the take-up reel pulley 61. An idler pulley 63 is also provided to engage the belt 62 for taking up the slack therein whenever desired. The scan lever 64 is mounted on a shaft 65*a* which carries an arm 65 (Fig. 4) connected to a belt crank lever 66 by means of a link 67. The idler pulley 63 is mounted upon a supporting arm 68, the adjustment of which may be varied by means of a screw 69 located in a slot 69*a* at an intermediate point of said arm 68.

Figure 4:
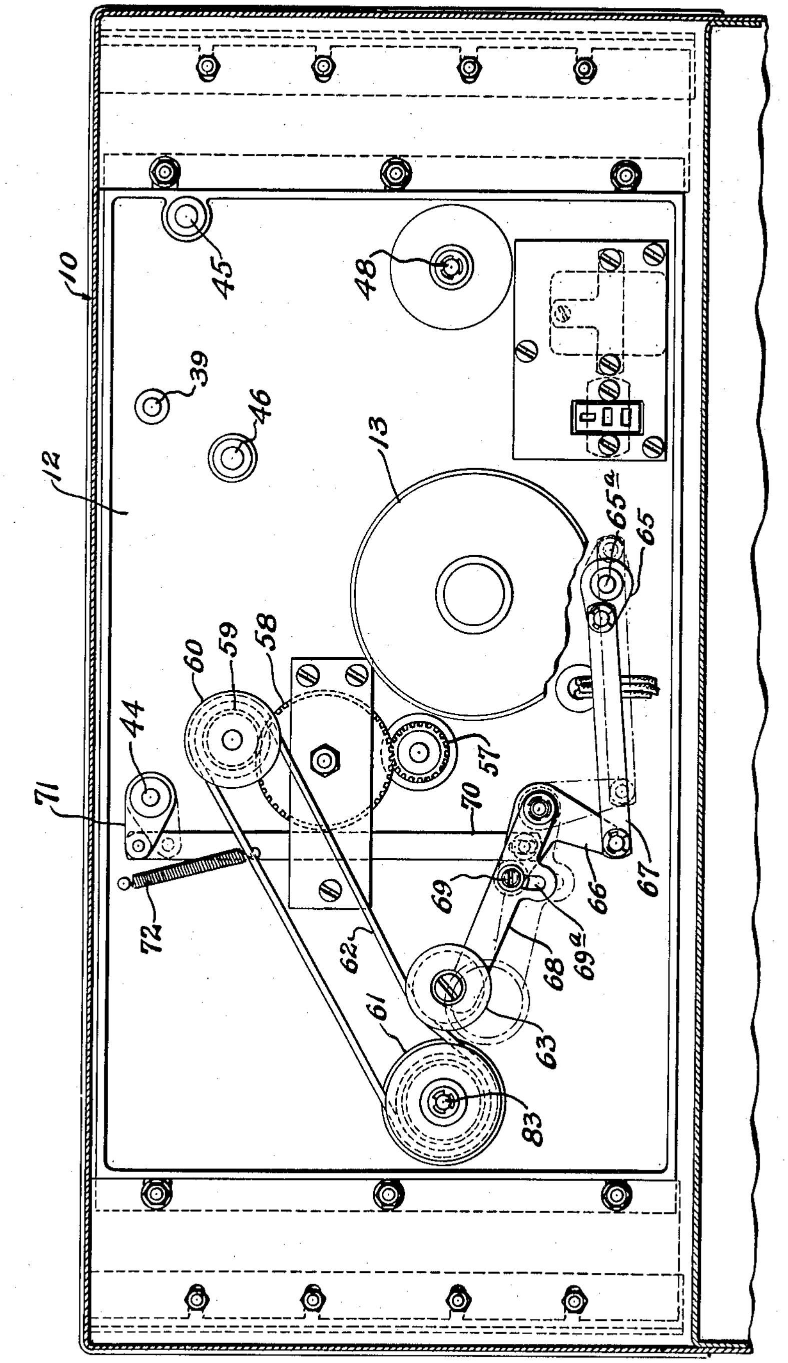
Fig. 4 is a rear elevational view of Fig. 1, showing in full lines the takeup belt tightened for recording or playback, the casing being sectional along the line 4—4 of Fig. 3.

Provision is also made of a pressure roller connecting link 70 upstanding from the base of the apparatus, which link is connected at its upper end to a pressure roller arm 71, said link 70 being urged upwardly by a coil spring 72 connected to an intermediate point on said link (Fig. 4).

The load lever 73 (Fig. 1) which is located adjacent the scan lever 64, has a lateral lip 74 underlying said scan lever 64 and being provided with a side arm 75 connected to a curved link 76 extending upwardly to a stud 77 secured to the pressure gate 18 and a loading link stud 78, said loading link stud being tensioned by a spring 79 (Fig. 1).

The bell crank lever 22*a* is connected by an angular link 80 (Fig. 2) to the loading link stud 78.

Provision is also made of a slip clutch plate 81 (Fig. 5) engaged by a coil spring 82 connected to the take-up reel spindle shaft 83 (Fig. 2) by means of which the tension on the take-up reel 20 can be varied as desired.

*Operation*

In reproducing a record of any type, it is frequently necessary to locate a particular point on said record.

In order to pass over unwanted portions of a disk record quickly, it is customary to slide the stylus needle over several grooves at a time without waiting to transcribe all of the material recorded on said grooves.

Similarly the present invention is designed to permit rapid manual scanning of the multiple headed magnetic tape recorder disclosed in the prior applications mentioned, by swiftly passing the tape over the rotating magnetic head turntable. Normally, thirty minutes of recorded tape may be scanned in fifteen seconds by this method.

A reel 19 of the tape 35 to be played back will first be placed upon the feed spindle 16 and locked in place by the crank 27.

To prepare the apparatus for threading the tape, the load lever 73 will be then turnd fully clockwise. The movement of the lever 73 will cause the scan lever 64 also to turn fully clockwise, by means of the lip 74. When this operation takes place, the load lever arm 75, by reason of the curved connecting link 76 and the stud 77 will raise the pressure gate 18. The associated pressure roller connecting link 80 will also raise the bell crank lever 22*a* carrying the tapered roller 23 and the tape tension shoe 22, at the same time.

The arm 65 connected to the scan lever 64 through the connecting link 67, will also rotate the bell crank 66. This in turn will release the pressure on the idler roller 63 of the take-up belt 62 by means of the arm 68. At the same time, the pressure roller 26 will be raised by means of the arm 71 and the connecting link 70 against the pressure of the spring 72.

All of these operations which occur at the same time, will clear a path for loading the tape 35 in a straight line into the apparatus, as shown in Fig. 2.

When the tape is drawn through this loading path, it will be connected to the take-up reel 20 at the right end of the apparatus and said reel will be locked in place by means of the crank 28.

The crank 28 on the take-up reel may then be turned manually to pull the tape through the apparatus until a point is reached which is adjacent to the area where playback is desired.

To play back the magnetic tape 35 on the reel 19, it will merely be necessary to turn the load lever 73 and the scan lever 64 fully counter-clockwise. This will hold the tension shoe 22 against the first guide roller 21 and provide the necessary tape tension for reproduction. This tension is created by the spring 36 and may be adjusted by the screw 37.

When the tape tension shoe 22 is pulled down, the taper roller 23 also moves downwardly causing the tape 35 to wrap around the guide drum 24, as shown in Fig. 1. In the same operation, the pressure gate 18 will be moved down from the loading position into the playback position as shown in Fig. 1.

The gate rollers 29, 30 together with the pressure plate 33, attached to the gate 18, will hold the tape 35 in contact with the magnetic heads of the turntable 14, which is rotated by means of the gear box 15 and the spindle 56 by the motor 13.

The downward travel of the gate 18 will be stopped by the stud 43 and the height of said gate above the turntable 14 may be readily adjusted by means of the screw 42.

The over-travel spring 79 (Figs. 1 and 5) permits the linkage mechanism to complete its cycle after the gate 18 strikes the stop stud 43, the gate sliding up and down smoothly in the guide-ways 40, 41.

The eccentric roller 31 may readily be controlled by the handle 32. This will permit manual variation in the distance between the drive roller 25 and the scanning point. This manual adjustment permits easy synchronization of the playback with the recording.

To scan, the lever 64 will be turned clockwise until the pressure roller 26 is raised from the drive roller 25 through the above mentioned connecting linkages. At the same time, the idler pulley 63 will be relieved from the belt 62, permitting the reel take-up spindle 17 to turn freely. The pressure gate 18 under these conditions will remain in its downward position and the pressure plate 33 will hold the tape in resilient contact with the turntable 14.

The tape may be manually advanced rapidly at will, by turning the handle 28 on the take-up reel 20.

It is to be understood that since the tape 35 is in contact with the turntable 14, fragments of sounds recorded on said tape will be heard.

It will also be understood that while the tape 35 is running through the machine at high speed, the sound will not be intelligible, but will be sufficient to permit the location of recorded areas to be easily identified. Partially unrecorded blank areas may be passed through the machine very rapidly in either direction without stopping the tape for listening to all of the material recorded thereon.

It is to be understood that once the location of the desired area on the tape is obtained, it may be instantly reproduced by returning the scan lever to a fully counterclockwise position, at which time normal playback will occur.

If scanning is being done on a tape which is completely modulated, periodic listening for a few seconds at a time only will be required to determine the exact location of the desired intelligence on the recording.

In normal playback position, the take-up reel 17 will rotate at a greater speed, which is less than the speed of the drive pulley 61, which is powered from the feed roller pulley 60 through the belt 62. This differential in speed between these elements is taken up by the clutch plates 81 and the clutch pressure spring 82, shown in Fig. 5.

While there has been disclosed in this specification, one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a scanning mechanism for a long playing magnetic tape recorder of the type comprising a drive roller for advancing a magnetic tape longitudinally, and having a rotating interrupted track magnetic recording head mounted on a vertical axis adjacent the path of the advancing tape, a gate for pressing said tape against said recording head, a pressure roller for pressing said tape against said drive roller to cause said tape to advance at its normal slow speed during recording or playback, and a manually operated scan lever having linkage means to lift said pressure roller free from said drive roller to permit said tape to be manually moved rapidly between said pressure gate and said magnetic head for scanning.

2. The invention as defined in claim 1, in which provision is made of a manually operated load lever having linkage means to lift said pressure gate from said magnetic head to permit still more rapid movement of said tape for loading and rewinding.

3. The invention as defined in claim 2, in which said load lever is provided with a side lip extending under said scan lever whereby manual movement of said load lever in the direction to release said pressure gate from said magnetic head will simultaneously release said pressure roller from said drive roller.

4. In an apparatus for magnetically recording intelligence upon and reproducing it from a moving flexible magnetic tape, a feed reel, a take-up reel, tape-advancing means including a cooperating drive feed roller and a pressure roller located on opposite sides of said tape, a pressure gate and a magnetic recording head also located on opposite sides of said tape, a guide roller and a guide drum, between said feed reel and said pressure gate, a bell crank lever carrying a tape tension shoe for pressing said tape against said guide roller, said bell crank lever also having a tapered roller for pressing said tape against said drum, and a manually actuated scan lever mechanically connected to said bell crank lever and said pressure roller to release said tape tension shoe, said tapered roller, and said pressure roller without releasing said pressure gate, to permit said tape to be passed manually rapidly through said apparatus for scanning.

5. The invention as defined in claim 4, in which a link connects said load lever with said pressure gate for releasing said gate when said load lever is manually actuated.

6. The invention as defined in claim 4, in which provision is made of a manually actuated load lever mechanically connected to said pressure gate and to said scan lever to release said pressure gate to permit a still more rapid passage of said tape through the apparatus for loading and rewinding.

7. The invention as defined in claim 5, in which said bell crank lever is connected to said link by a link embracing said guide drum.

8. In a long-playing magnetic tape recorder, provided with a rotating turntable member having a plurality of recording heads arcuately disposed thereon adapted to contact with said tape while said turntable member rotates at slow speed during recording and reproduction, a feed reel, and a take-up reel for said tape, a hand crank connected to said take-up reel, said feed and take-up reels being rotatably disposed at opposite sides of said turntable and at right angles thereto for guiding said tape flatwise across said turntable, a motor for driving said turntable, a pulley, a belt connected to said pulley and to said motor for driving said take-up reel therefrom, said belt being held in taut driving condition upon said pulley by an idler roll, and manually-operated linkage means to release said idler roll from said belt whenever it is desired to manually turn said hand crank so as to scan said tape more rapidly than in normal reproduction.

9. The invention as defined in claim 8, in which provision is made of a manually actuated scan lever connected to said idler roll release linkage.

10. In a long-playing magnetic tape recorder, provided with a rotating turntable member having a plurality of recording heads arcuately disposed thereon adapted to contact with said tape while said turnable member rotates at slow speed during recording and reproduction, a feed reel, and a take-up reel for said tape, a hand crank connected to said take-up reel, said feed and take-up reels being rotatably disposed at opposite sides of said turntable and at right angles thereto for guiding said tape flatwise across said turntable a motor for driving said turntable, a friction slipping connection between said take-up reel and said motor, and manually operated means to disengage said connection whenever it is desired to manually turn said hand crank so as to scan said tape more rapidly than in normal reproduction.

11. The invention as defined in claim 9, in which provision is made of a manually actuated load lever having a side lip to engage said scan lever and cause simultaneous actuation of said scan and load levers.

12. The invention as defined in claim 8, in which provision is made of a cooperating pressure roller and a drive feed roller located on opposite sides of said tape, and which said idler roll operating linkage is connected with an arm upon which said pressure roller is mounted.

13. The invention as defined in claim 9, in which toggle mechanism is provided to lock said idler roll linkage in engaged and disengaged positions with respect to said belt.

References Cited in the file of this patent

UNITED STATES PATENTS

| | | |
|---|---|---|
| 2,595,197 | Kuhlow | Apr. 22, 1952 |
| 2,639,333 | Howell | May 19, 1953 |